Oct. 9, 1962  R. G. JOHNSON  3,057,045
METHOD OF ASSEMBLING ROLLER BEARINGS
Filed July 2, 1959  2 Sheets-Sheet 1
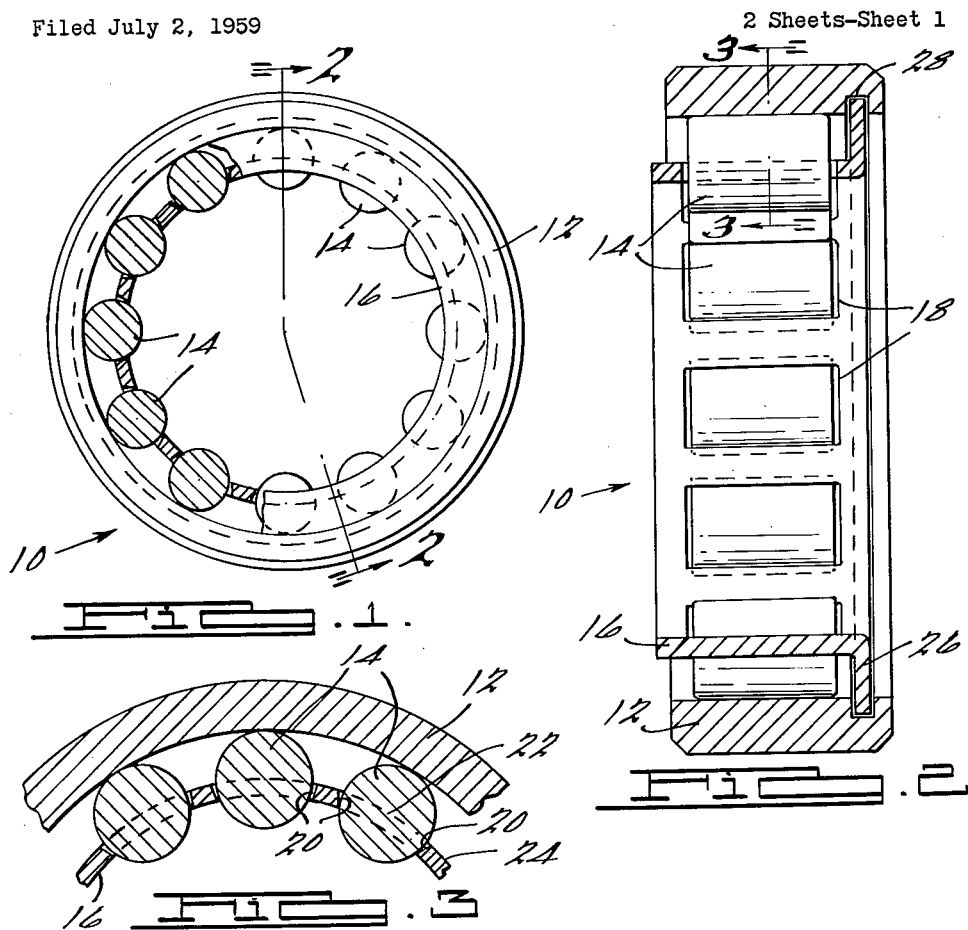
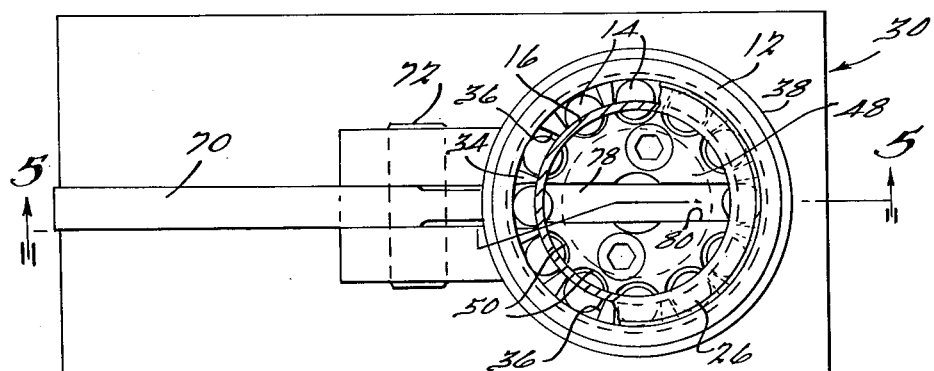
INVENTOR.
Raymond G. Johnson.
BY
Harness, Dickey & Pierce.
ATTORNEYS Oct. 9, 1962 R. G. JOHNSON 3,057,045
METHOD OF ASSEMBLING ROLLER BEARINGS
Filed July 2, 1959 2 Sheets-Sheet 2
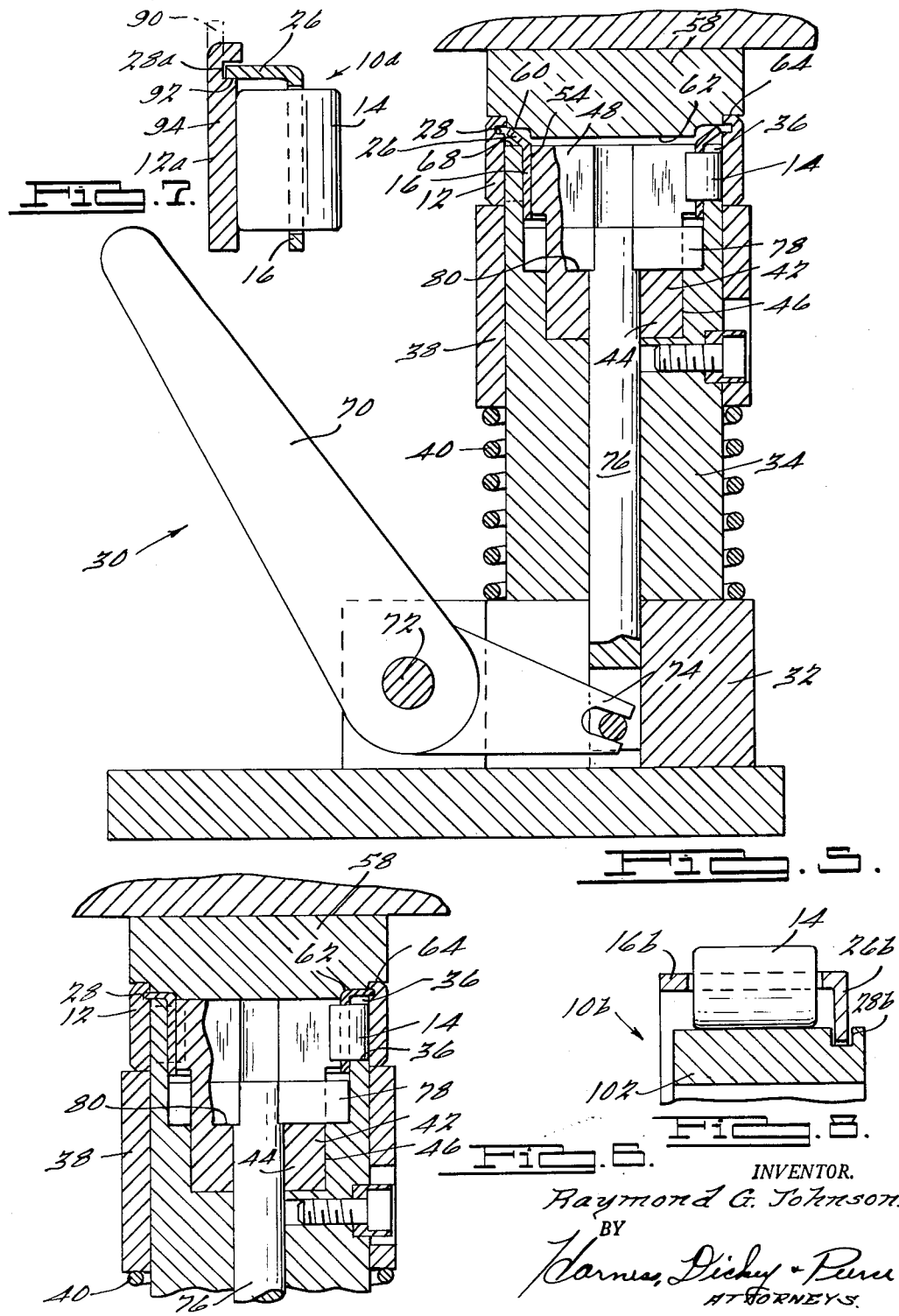
INVENTOR.
Raymond G. Johnson.
BY
Harness, Dickey & Pierce.
ATTORNEYS.

3,057,045
METHOD OF ASSEMBLING ROLLER BEARINGS
Raymond G. Johnson, Grosse Pointe, Mich., assignor to Federal-Mogul-Bower Bearings, Inc., Detroit, Mich., a corporation of Michigan
Filed July 2, 1959, Ser. No. 824,708
5 Claims. (Cl. 29—148.4)

This invention relates generally to roller bearings and more particularly to a method of assembling a roller bearing.

An object of this invention is to provide an improved method of assembling a roller bearing which utilizes the insertion of a flange on a roller retainer ring in a groove in the bearing race for maintaining the race and retainer in assembly relation.

Further objects, features and advantages of this invention will become apparent from a consideration of the following description, the appended claims and the accompanying drawing in which:

FIGURE 1 is a plan view of a straight cylindrical roller bearing and outer race assembly embodying this invention;

FIG. 2 is an enlarged sectional view looking along the line 2—2 in FIG. 1;

FIG. 3 is a fragmentary sectional view looking along the line 3—3 in FIG. 2;

FIG. 4 is a top view of a machine for assembling the roller bearing of this invention;

FIG. 5 is a sectional view looking along the line 5—5 in FIG. 4 showing the components of a bearing in positions to be assembled;

FIG. 6 is a sectional view, illustrated similarly to FIG. 5, showing the bearing components in a finally assembled position;

FIG. 7 is a fragmentary sectional view of a modified form of the roller bearing of this invention; and FIG. 8 is a fragmentary sectional view of a roller bearing and inner race assembly embodying this invention.

With reference to the drawing, a straight cylindrical roller bearing of this invention, indicated generally at 10, is illustrated in FIG. 1 as consisting of an outer race member 12, a plurality of rollers 14, and a retainer ring 16. The ring 16 is formed with a plurality of slots or pockets 18, corresponding to the rollers 14, which are parallel to the axis of the ring 16. Each of the slots or pockets 18 is of a length slightly greater than the length of the corresponding roller 14 and is of a width slightly less than the diameter of the roller 14 so that the roller 14 cannot be moved through the slot 18.

The side edges 20 of the ring 16 on the opposite sides of each slot 18 are swaged so that the edges 20 converge in a direction radially inwardly of the ring 16. Consequently, a roller 14 is movable into its corresponding slot 18 from a position outside the ring 16 to a position in which the axis 22 of the roller 14 is aligned with the outer surface 24 of the ring 16. The retainer ring 16 has a radially outwardly extending flange 26 which extends into a peripheral groove 28 formed in the inner surface of the outer race 12. The groove 28 is rectangular in cross section and is very slightly larger than the portion of the flange 26 which extends into the groove. This arrangement of the outer race 12 and the retainer ring 16 maintains these elements in an assembly relation and maintains the rollers 14 in positions in riding engagement with the outer race 12.

As shown in FIG. 2, one end of the bearing is open between the outer race 12 and the retainer ring 16 to provide a convenient space through which lubricant may be applied to the rollers 14. The bearing 10 is particularly useful in radial bearing installations, in which the rollers 14 are substantially horizontal and the one-piece retainer ring 16 rides on the rollers 14 at the lower side of the bearing, so that the assembly 10 is relatively quiet.

In the assembly of the bearing 10, a machine indicated generally at 30 in FIGS. 4, 5 and 6 is utilized. The machine 30 has a base 32 on which a vertically extending cylindrical body member 34 is mounted. The body member 34 has slots 36 at its upper end which are longer than the rollers 14 and are of widths corresponding substantially to the diameters of the rollers 14. An outer race supporting sleeve 48 extends about the body 34 and is supported on a spring 40 which likewise extends about the body 34 and is supported on the base 32. An inner cylinder 42 has a reduced diameter lower end portion 44 which is positioned in a cylindrical cavity 46 in the body 34 and has an enlarged upper end portion 48 which is formed with a plurality of vertically extending grooves 50 corresponding in number to the number of rollers 14. Each groove 50 is of a size to partially receive a roller 14 therein in a nested position in the groove 50.

To assemble a bearing 10, the bearing retainer ring 16 is positioned within an annular space 54 between the cylinder portion 48 and the body 34. The ring 16 at this time is of the shape shown in FIG. 5 with the flange 26 extending upwardly and outwardly from the ring 16. The rollers 14 are moved in directions radially inwardly of the ring 16 through the slots 36 to positions extending through the slots 18 in the ring 16 and into the grooves 50 in the cylinder 42.

The outer race 12 is then supported on the sleeve 38 with the groove 28 at the top end of the race 12. With the parts in this position, a vertically movable head 58 is moved downwardly to a position in which an annular horizontal shoulder 60 located slightly above the lower end 62 of the head 58 engages the upper end of the ring flange 26. A second shoulder 64 on the bottom end of the head 58 which is vertically offset from the shoulder 60 and extends about the shoulder 60 engages the race 12 and moves the race 12 downwardly concurrently with bending of the flange 26 by the shoulder 60 toward a position perpendicular to the ring 16.

The shoulder 64 is offset from the shoulder 60 a distance corresponding to the spacing of the groove 28 from the adjacent edge of the race 12 so that the groove 28 is at the outer edge of the shoulder 60. Consequently, the terminal end of the flange 26 is guided into the groove 28. In other words, the race 12 moves downwardly concurrently with a movement of the flange 26 downwardly and outwardly into the groove 28. The thickness of the portion of the cylinder 34 in which the slots 36 are formed is less than the length of the flange 26 so that when bent the flange 26 extends across the upper ends of the slots 36 and projects into the groove 28.

To remove the assembly 10 from the machine 30, the head 58 is first raised. A handle 70, which is pivotally mounted intermediate its ends on a shaft 72 carried by the base 32, has a fork shape end portion 74 which is moved upwardly to in turn move a plunger 76 upwardly. The plunger 76 is mounted for reciprocal movement in the body 34 and at its upper end has a transversely extending rod 78 secured to it and mounted for up and down movement in a slot 80 in the cylinder 42. When the rod 78 is moved upwardly it engages the lower end of the ring 16 and moves the ring 16, with the race 12 and rollers 14 mounted thereon, upwardly out of the machine 10.

A modified form of the bearing of this invention, indicated generally at 10a, is illustrated in FIG. 7. In its final form the bearing 10a is substantially identical to the bearing 10. However, the bear 10a is assembled in a different manner than the bearing 10 because the flange 26 is formed on the retainer ring 16 prior to assembly with the outer race 12a which has a reduced thickness axial extension 90 formed thereon. To assemble the outer race 12a with the rollers 14 and the retainer ring 16, the outer race 12a is moved to a position in which the flange 26 extends across the shoulder 92 formed at the juncture of the reduced thickness extension 90 with the main part 94 of the outer race 12a. The extension 90 is then bent so that it is of an L-shape to form the groove 28a in which the flange 26 is retained.

From the above description, it is seen that this invention provides a bearing assembly 10 in which the rollers 14 are positively maintained in operative positions between the retainer 16 and the outer race 12. The construction of the bearing 10 so that the space between the retainer ring and the outer race is open at one end of the rollers 14 provides for ready lubrication of the bearing. Although the assembly of the retainer ring and the rollers has been particularly described with respect to an outer race member, it is apparent that they can be assembled in the same manner with an inner race member, such as the member 102 in the inner race and roller assembly 10b shown in FIG. 8. In the assembly 10b, the flange 26b extends radially inwardly of the retainer ring 16b into a groove 28b in the outer surface of the inner race member 102. The ring 16b in the assembly 10b performs the same functions as the corresponding ring 16 in the assembly 10 and can be assembled with the race 102 in a machine similar to the machine 30 or in the manner illustrated in FIG. 7.

It will be understood that the specific construction of the improved race and roller assembly and specific method of assembling roller bearings which are herein disclosed and described is presented for purposes of explanation and illustration and is not intended to indicate limits of the invention, the scope of which is defined by the following claims.

What is claimed is:

1. The method of assembling a plurality of rollers with a generally tubularly shaped retainer ring having a plurality of slots corresponding to said rollers and of a size to receive said rollers therein but of a width less than the diameter of said rollers to prevent movement of the rollers through the slots, and a race member having a peripheral groove in one surface, said method comprising the steps of moving the plurality of rollers radially into the plurality of slots in the retainer ring, forming a flange by bending one end of said retainer ring over its entire circumferential periphery substantially simultaneously in a direction such that it projects radially of the ring, and concurrently moving said race member to a position substantially concentric with said rollers in a location in which said flange is moved into the groove in said race member.

2. The method of assembling a plurality of rollers with a generally tubularly shaped retainer ring having a plurality of slots corresponding to said rollers and of a size to receive said rollers therein but of a width less than the diameter of said rollers to prevent movement of the rollers through the slots, and a race member having a peripheral groove in one surface and arranged in a concentric relation with said retainer ring, said method comprising the steps of moving the plurality of rollers radially into the plurality of slots in the retainer ring, forming a flange by bending one end of said retainer ring radially outwardly so that said end is moved along a curved path extending in a direction radially of said ring and toward said rollers, concurrently moving said race member toward a position extending about said rollers and in the direction of bending of said flange, whereby said flange is progressively moved into the groove in said outer race.

3. The method of assembling a plurality of rollers with a generally tubularly shaped retainer ring having a plurality of slots corresponding to said rollers and of a size to receive said rollers therein but of a width less than the diameter of said rollers to prevent movement of the rollers through the slots, and an outer race member having a peripheral groove in its inner surface, said method comprising the steps of moving the plurality of rollers radially into the plurality of slots in the retainer ring, forming a flange by bending one end of said retainer ring radially outwardly so that said end is moved along a curved path extending radially outwardly and longitudinally of the ring toward said rollers, concurrently moving said outer race in the same direction longitudinally of the ring toward a position extending about said rollers, whereby said flange is progressively moved into the groove in said outer race.

4. The method of assembling a retainer ring, having a plurality of slots for retaining therein a plurality of rollers, to a race member having a peripheral groove in one surface; said method of assembling the retainer ring and the race member comprising the steps of forming a flange by bending one end of the retainer ring over its entire circumferential periphery substantially simultaneously in a direction such that it projects radially of the ring, and concurrently moving the race member to a position substantially concentric with the plurality of slots in the retainer ring and to a location in which the flange is moved into the groove in the race member.

5. The method of assembling a plurality of rollers within a generally tubularly shaped retainer ring having a plurality of slots corresponding to said rollers and of a size to receive said rollers therein but of a width less than the diameter of said rollers to prevent movement of the rollers through the slots, and an inner race member having a peripheral groove in its outer surface, said method comprising the steps of moving the plurality of rollers radially into the plurality of slots in the retainer ring, forming a flange by bending one end of the retainer ring radially inwardly so that the one end is moved along a curved path extending radially inwardly and longitudinally of the ring toward the rollers, concurrently moving the inner race in the same direction longitudinally of the ring toward a position substantially concentric with the rollers, whereby the flange is progressively moved into the groove in the inner race.

References Cited in the file of this patent

UNITED STATES PATENTS

| | | |
|---|---|---|
| 642,342 | Levedahl | Jan. 30, 1900 |
| 688,927 | Bunnell | Dec. 17, 1901 |
| 1,011,029 | Chambers | Dec. 5, 1911 |
| 1,018,324 | Kempster | Feb. 20, 1912 |
| 1,350,325 | Miller | Aug. 24, 1920 |
| 1,437,431 | Lonbom | Dec. 5, 1922 |
| 1,611,976 | Williford | Dec. 28, 1926 |
| 1,699,571 | Rouanet | Jan. 22, 1929 |
| 2,409,236 | Banker | Oct. 15, 1946 |
| 2,586,087 | Reynolds | Feb. 19, 1952 |
| 2,818,313 | Gales | Dec. 31, 1957 |